Sept. 8, 1936.                J. E. PAGE                2,053,680
                          ICE CREAM CONTAINER
                         Filed June 20, 1932          2 Sheets-Sheet 1
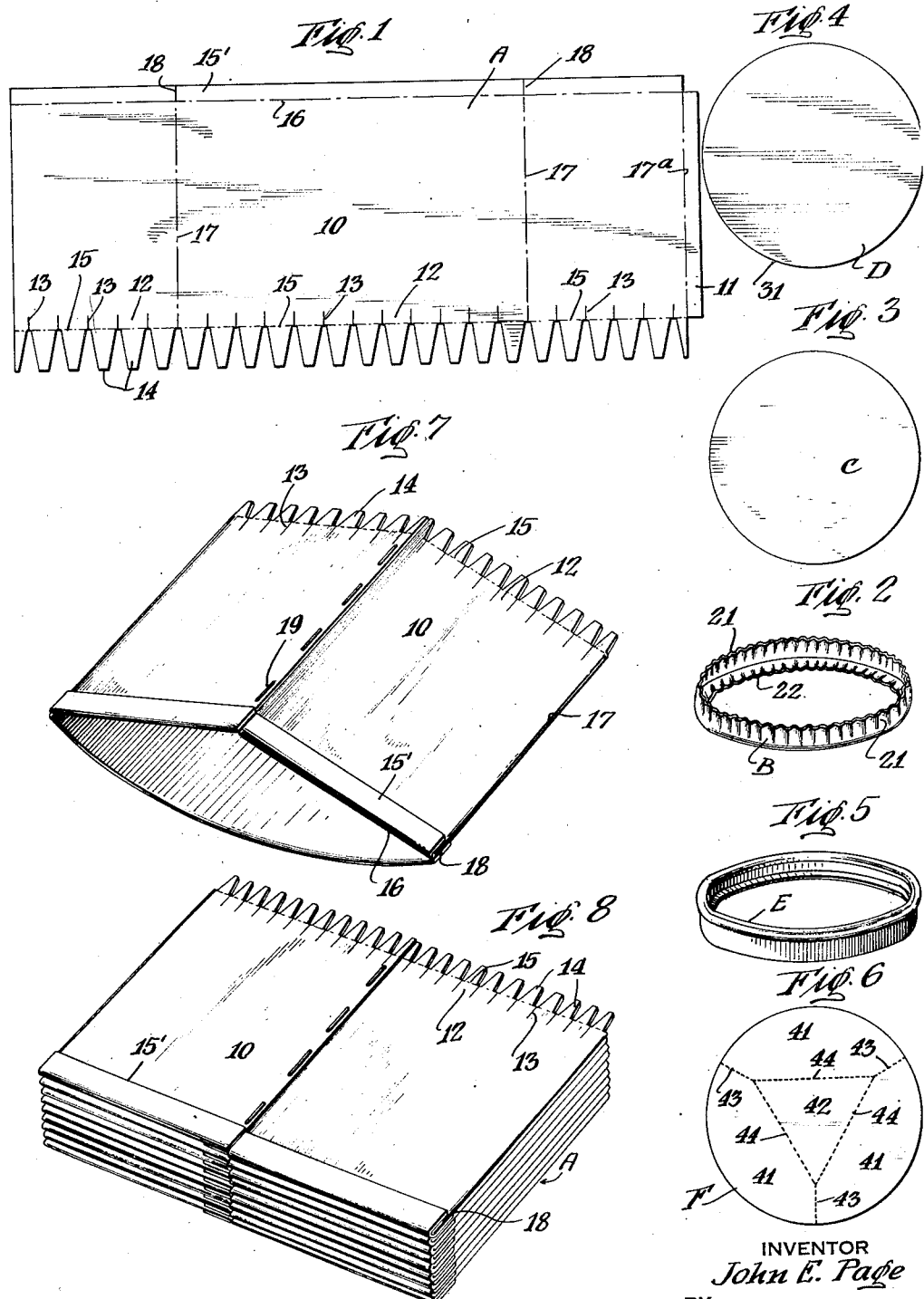
INVENTOR
John E. Page
BY
Austin Fix
ATTORNEYS Sept. 8, 1936.　　　　J. E. PAGE　　　　2,053,680
ICE CREAM CONTAINER
Filed June 20, 1932　　　2 Sheets-Sheet 2
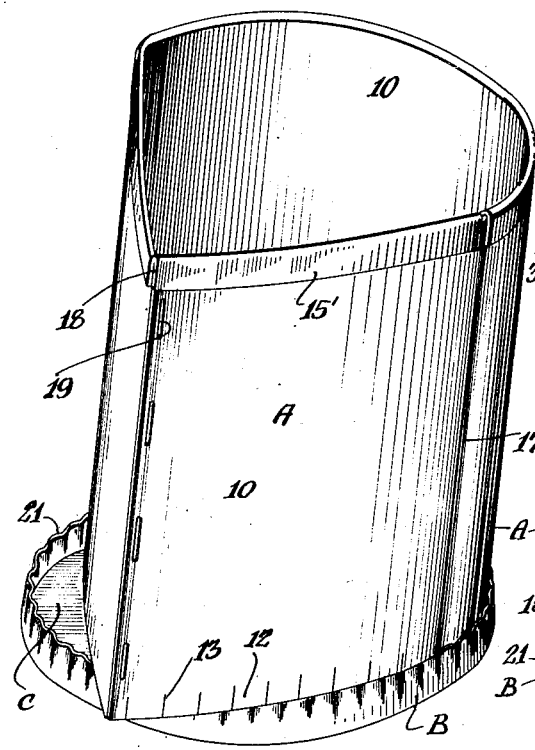
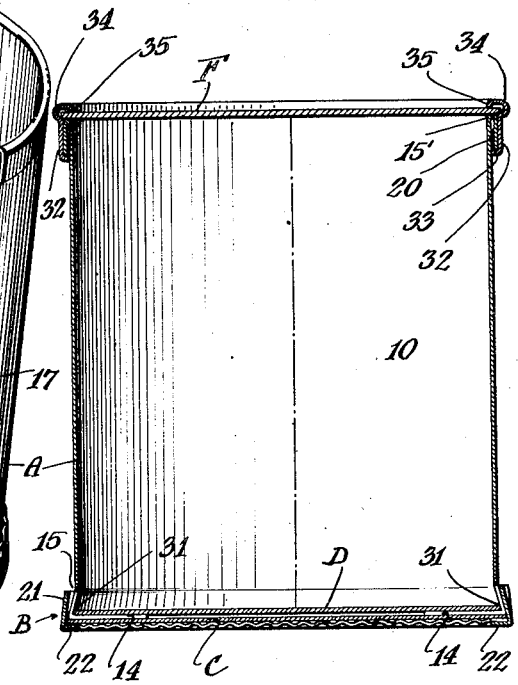
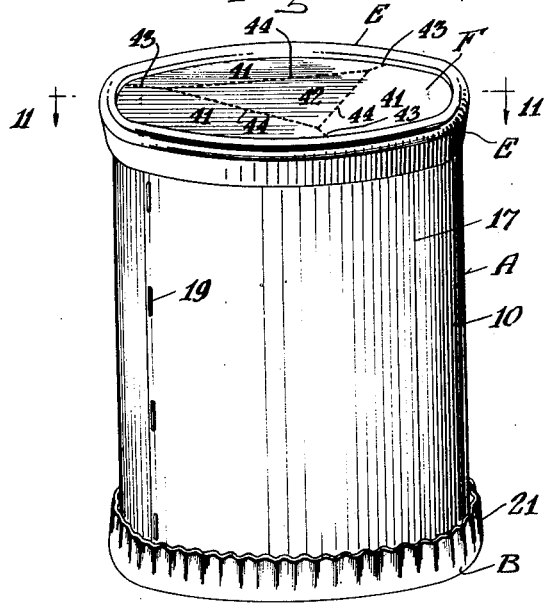
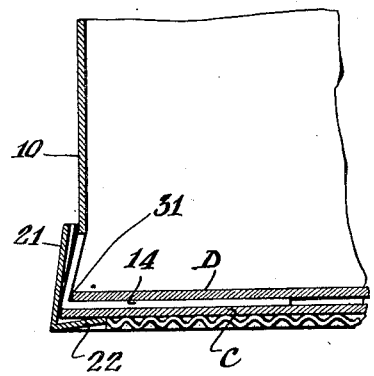
INVENTOR
John E. Page
BY
Austin & Dix
ATTORNEY Patented Sept. 8, 1936

2,053,680

UNITED STATES PATENT OFFICE 2,053,680

ICE CREAM CONTAINER

John Ernest Page, Sydney, New South Wales, Australia, assignor, by mesne assignments, to President and Directors of The Manhattan Company, New York, N. Y., a corporation, as trustees Application June 20, 1932, Serial No. 618,129

11 Claims. (Cl. 229—5.5)

This invention relates to ice cream containers and more particularly to a container which may be economically discarded after a single use, and to a method of making and assembling the same.

In the handling of ice cream under present methods, the manufacturer, wholesaler, and retailer is confronted with serious problems of sanitation. The metal cans for packaging ice cream heretofore used are expensive in first cost and must necessarily be used over and over again until worn out. These metal containers are, therefore, collected after use from the retailer, who removes the cream, and returns the container to the ice cream plant where the container is washed and repacked. Cream readily decomposes and the remnants of cream which remain in the metal container, prior to the washing thereof, is most attractive to flies, cockroaches, ants, mice, rats, and other vermin. The retailer must wait until the containers can be conveniently collected, and, during this period, the empty containers, wherever placed, create undesirable odors, attract flies and vermin, are a menace to health, cause the retailer great inconvenience and occupy valuable space. Since the metal containers are necessarily heavy, the cost of transportation and handling of the containers to and from the ice cream plant amounts to no inconsiderable sum. Heavy trucks and collecting devices must be provided for this purpose, as well as a collection crew. Furthermore, during the journey from the retailer to the ice cream plant, the metal containers continue to attract the flies and vermin. The health menace is further increased when the containers reach the ice cream plant where they must often stand around for a considerable time before they can be conveniently washed and cleansed.

The peak production of ice cream is during hot and sultry days, yet economical production prevents the employment of the necessary man power during peak production to immediately wash the cans. During such days, therefore, when the containers are most attractive to swarms of flies and vermin, the washing of the containers is most greatly delayed. Storage space must also be reserved for the empty containers, and washing equipment and a washing crew must be provided to wash and cleanse the empty containers. The manufacture of ice cream represents a considerable industry, and consumption thereof is mounting yearly, yet, while the need for a more sanitary and efficient way of handling ice cream has been long needed, no satisfactory method or devices to achieve these recognized and desirable results have been provided.

The subject matter of this invention is concerned with a satisfactory solution of the problems above presented. In accordance with this invention, a container is provided which can be so cheaply made as to permit the container to be economically discarded and destroyed by the retailer without necessitating the washing or returning of the same. The container comprises generally a collapsible tubular member formed from a single blank of paperboard material. The bottom end of the blank is slit at spaced intervals to provide expansible finger portions which are adapted to be expanded outwardly. At the end of the outwardly expansible portion of each finger an inturned portion is provided. When the blank has been bent and secured together into tubular form, the expansible end thereof may be telescoped or inserted into a bottom closure having a metallic inclined side wall. An inner piece or disc is inserted into the tubular body and pressed down against the bottom of the container. This inner piece is slightly oversize with respect to the tubular body so as to press the expansible fingers at the end of the tubular member outwardly and to securely interlock the body member to the bottom closure.

The top end of the tubular member is provided with a rim which is formed by bending over an edge portion of the body forming blank before the blank is secured together into tubular form. A top closure is provided which is formed from a metallic flange portion and a removable end piece. When the container has been filled, the top closure may be telescoped over the end of the container so that the metallic flange of the closure interlocks with the rim portion of the tubular member, thus preventing removal of the closure member and insuring a sealed container in which the contents are fully protected. Access to the container is accomplished by pulling out the top piece of the closure, leaving the metallic flange in place to stiffen the body of the container and prevent inward collapse thereof as the contents are being removed. The body forming blanks are formed by running a sheet of paperboard material through a cutting and scoring machine which cuts out the finger portions at one end of the blank, and makes the necessary score lines. A pair of vertically extending score lines are preferably formed in the blank, these score lines being positioned diametrically opposite one another when the side edges of the blank are secured together to form a tubular container.

These vertically extending score lines permit the body member to be shipped in collapsed flat condition, thus permitting the containers to be shipped in compact form, economizing in both shipping and storage costs.

The container may be quickly and easily set up by the user by expanding the body member into tubular form, accomplished by applying a slight inward pressure to the same along the score lines and thereby causing the body segments to assume an arcuate form. The fingered end of the body member may then be quickly inserted into the bottom closure and the inner piece inserted to expand the fingers outwardly to securely interlock the body member to the bottom closure. After the container has been filled with ice cream, the top closure may be snapped into place and the packed container may then be sent to the refrigerating room where the cream is frozen within the sealed container. The container and contents are delivered to the retailer in sealed condition with the assurance that the contents have not been tampered with. Access to the container is easily made by breaking through the weakened score lines provided therein and then pulling out the segments comprising the top piece of the cover. The metallic cover remains in locked position and stiffens and strengthens the upper edge of the container and prevents inward collapse of the side walls prior to and during the removal of the contents. Except for the bottom rim and the top rim, which are preferably of metal, the container is made entirely of waxed or moisture proof fibreboard which can be inserted into an incinerator and burned as soon as the cream has been removed therefrom. The retailer is thus saved the bother and expense of returning the empty cans, providing storage space therefor, and is furthermore relieved of the unsanitary and unhealthy condition which necessarily prevails where empty unwashed cans stand about. The wholesaler and retailer, as well as the manufacturer, is also relieved from the expense, annoyance, inconvenience, and the unsanitary conditions which accompany the use of a metal returnable container.

An object of this invention is to provide an ice cream container which is strong, durable and attractive, and which can be manufactured at such a price as to make it economical to discard the container after a single use.

Another object of my invention is to provide a container especially adapted for the packaging of ice cream which may be shipped to the ice cream manufacturer in collapsed condition so as to occupy a minimum of shipping and storage space, and which may be set up and assembled by the ice cream maker quickly, economically and efficiently without special equipment or tools.
Another object of my invention is to provide an ice cream container which is strongly reinforced along the top and bottom edges thereof where containers are normally subjected to the greatest strain and abuse.
Still another object of my invention is to provide a collapsible ice cream container which may be conveniently set up by the ice cream maker, filled with the liquid cream, and then permanently sealed, protecting the contents and preventing undetectable access thereto.

Another object of my invention is to provide a fibreboard container for ice cream and the like, which is provided with a top closure member which may be sealed in position after the container is filled with ice cream, the closure member being so made as to make it practically impossible to replace the same to its original sealed condition without visibly mutilating the same.

Another object of my invention is to provide a collapsible container for ice cream and the like which combines the desirable qualities of a collapsible body portion, an unusually strong bottom closure which may be easily and quickly locked to the body member by the ice cream maker without the use of glue, staples or other securing means, and a top closure which may be easily and quickly sealed and secured to the container when the contents have been inserted therein.

Another object of my invention is to provide a method for making and assembling collapsible ice cream containers efficiently, quickly and economically without the use of special tools or other equipment.

Another object of my invention is to provide a novel method of dispensing and marketing ice cream in an economical, efficient and sanitary manner.

Other objects of this invention will become apparent as the disclosure proceeds.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 is a face view of a cutout blank from which the body member of the container is formed;

Fig. 2 is a perspective view of the bottom rim which forms a part of the bottom closure;

Fig. 3 is a face view of the bottom piece which fits within the metallic rim shown in Figure 2 to complete the bottom closure;

Fig. 4 is a face view of the inner plate or disc which fits within the container and expands the body member in and into interlocking engagement with the bottom closure;

Fig. 5 is a perspective view of the top rim which forms a part of the top closure;

Fig. 6 is a face view of the top piece which fits within the top rim shown in Figure 5 and completes the top closure;

Fig. 7 is a perspective view of a tubular body member formed from the body blank shown in Figure 1;

Fig. 8 is a perspective view of a plurality of tubular body members in collapsed condition and arranged in stacked relationship;

Fig. 9 is a perspective view of the container at one step of the setting up operation, the body member being shown in the process of being inserted within the bottom closure;

Fig. 10 is a perspective view of the container as it appears when filled and sealed;

Fig. 11 is a vertical cross sectional view through the container, this view being taken on line 11—11 of Figure 10; and

Fig. 12 is a fragmentary vertical cross sectional view through the container to illustrate more particularly the bottom construction thereof.

Similar reference characters refer to similar parts throughout the several views of the drawings.

There is shown in Figure 1 a blank A of fibreboard or paperboard material from which the body member of the container is formed. The blank A is preferably made of fibreboard of considerable strength and may be waxed on the inside or on the outside thereof, or both, so as to more effectively preserve the contents of the container and protect the fibreboard against the weakening effect of moisture. If desired, a moisture proof paper or fibreboard in place of waxed fibreboard may be used. The blank is cut to the shape shown and comprises a main body portion 10 having a side edge tab portion 11 defined from the main body portion by a score line 17a. The tab portion 11 may be secured to the opposite side edge of the body portion 10 by staples, thread stitches or other means. The bottom end of the blank is provided with a plurality of expansible fingers 12 which are separated from one another by the slits or cuts 13. The outer ends of the fingers 12 are provided with tab portions 14 bendable along the score lines 15. The fingers 12 are arranged to be expansible outwardly while the tab portion 14 may be turned inwardly when the blank is folded into tubular form.

A score line 16 runs parallel with the upper edge of the blank so as to define a rim portion 15' which may be folded over the main portion of the blank 10 before the blank is bent into tubular form. In practice, it has been found desirable to secure the rim 15', as by glue 20 or otherwise, to the main portion of the blank 10 to securely hold the same in position.

A pair of vertically extending score lines 17 run transversely across the blank. The score lines 17 are so arranged as to lie diametrically opposite one another when the blank is folded into tubular form. The score lines 17 permit the tubular body member to be folded in collapsed position, as shown in Figures 7 and 8. With the score lines 17 and 17a arranged as above described a slight inward pressure exerted against the body member will cause the body member to expand into tubular form.

The blank A map be cut to the proper shape and scored as desired in one operation by means of a cutting and scoring machine. These blanks can, therefore, be quickly and effectively produced at very little cost.

The bottom rim B, shown in Figure 2, comprises an upstanding side wall portion 21 which is inclined or tapered inwardly, as clearly shown in Figures 11 and 12. A flange portion 22 extends inwardly from the side wall portion 21 and provides a seat for the bottom piece C which is inserted therein. The bottom rim B is preferably made of metal and the inturned flange portion 22 should be relatively stiff so as to adequately carry the weight imposed thereon. If desired, the side wall portion 21 and the inturned flange portion 22 of the bottom rim may be corrugated, as shown in the drawings, to further strengthen and stiffen the same.

An inner piece or disc D which is oversize with respect to the main portion 10 of the tubular body member A, is inserted into the container and the edge 31 thereof expands the fingers 12 into interlocking engagement with the inclined side wall portion 21 of the bottom ring B. The inner disc D also provides a further reinforcing for the bottom of the container and provides a smooth and finished surface for the contents to rest upon.

The top closure is formed from a top rim E, preferably of metallic material, and a top piece F of fibreboard which is scored to allow it to be broken and removed. The top rim E comprises generally a continuous band portion 32 having an inturned lip 33 at the lower edge thereof. The upper edge of the rim is provided with an overhanging bead 34 and an inturned rounded edge portion 35. The edges of the top piece F seat within the out-turned bead portion 34 of the rim and extend under the inturned edge 35. The top closure as thus assembled telescopes over the body member A and the inturned lip portion 33 thereof snaps into seating engagement beneath the rim portion 15' of the body member. When so positioned, the top rim E cannot be removed and access to the contents of the container can only be had by removing the top piece F of the closure.

To facilitate removal of the top piece F, a series of score lines 43 and 44 are provided which define the areas 41 and 42, as shown in Figures 6 and 10. The top piece F may be removed by severing the same along the score lines 43 and 44 and removing the segments 41. If found more desirable, the top piece F may be removed in a whole condition by providing a suitable finger grip by means of which the top piece may be pulled out by force.

Where containers have to be shipped great distances, the space which they occupy during shipment is a very important item. The container herein disclosed is so made as to permit shipment thereof in collapsed condition. The tubular members A, shown in Figure 7, may be vertically stacked one upon the other, as shown in Figure 8. A large number of these tubular members will then occupy a very small amount of space. The bottom rims B may be bound together by wire or cord, with the bottom pieces or discs C and D placed therein. In the same manner, the top rims E may be bound together with the top pieces or discs F in position. When so stacked, the parts occupy very little space.

When the containers are desired for use by the ice cream manufacturer, the tab portions 14 of the tubular body member A are bent inwardly and the tubular member grasped and bulged or arcuated outwardly. Having previously inserted the bottom piece C within the bottom rim B, the fingered end of the tubular member is inserted into the bottom closure. This is accomplished, as shown in Figure 9, by first inserting and fitting the arcuate portion of the tubular member A within the side wall 21 of the bottom rim. A slight inward pressure against the remaining circumferential portion of the body will place the fingered end of the tubular member entirely within the side wall 21 of the bottom rim. The inner disc D, slightly oversize, is then inserted through the open end of the container and forced down into the bottom thereof until the same seats against the inturned top portions 14 and causes the fingered portion 12 to expand outwardly so as to house under and interlock with the inclined side wall 21 of the bottom rim. The bottom closure is thus securely held bound and locked to the tubular body member of the container without the use of glue, staples or other undesirable securing means. No special equipment or tools are required to set the container up as above described, and with a little skill, the bottom closures can be snapped and locked into place with great rapidity.

The containers are then filled with liquid cream and the top closure is then applied. This is accomplished by inserting the top piece F within the top rim E so that the edge of the disc F seats within the bead 34 and against the inturned flange portion 35 thereof. The inwardly extending lip portion 33 of the top rim E is of slightly less diameter than the outside diameter 14 of the rim portion 15' of the tubular member A. Since the fibreboard is resilient, the top rim E may be forced down over the rim portion 15' by exerting a slight pressure thereon. When the top rim has been forced sufficiently downward, the inturned lip portion 33 thereof snaps beneath the lower edge of the container rim 15', thus securing the top closure rim firmly in place. It is substantially impossible to remove the rim E without destroying the container, and the liquid cream is not only fully protected against contamination and outside influences, but it is impossible to gain access to the contents without leaving visible traces that access has been made.

The sealed containers containing the liquid cream are then transferred to a refrigerating room where the cream is gradually frozen. The low temperatures have no deteriorating or harmful effects on the container or the materials from which it is made.

When the cream has become sufficiently hardened or frozen, the sealed container of frozen cream is ready for shipment or transportation to the retailer or user. The containers are very light, and for this reason, more ice cream can be carried by truck or other transportation means than was heretofore possible with heavy metal cans. A considerable saving in handling and transportation costs is thus effected. Furthermore, the container is unusually strong and will withstand the most severe abuse. The container filled with ice cream can be dropped or thrown considerable distances without breaking.

Upon receipt of the sealed container by the retailer or user, the container may be placed in a refrigerating box to keep the contents in cold condition. The top rim E provides a hand grip for lifting the container about. The retailer or user obtains access to the contents by breaking the top piece F along the lines of weakness 43 and 44, and removing the segments 41. It is understood that if desired the cover need not be broken into segments, but can be pulled out by force, with the aid of a suitable finger grip attached thereto. It will be noted that although the top piece F of the top closure is removed to permit access to the contents, the top rim E remains locked to the rim portion 15' of the container. The rim portion 15' thus stiffens, strengthens and holds the container rigid and prevents inward collapse thereof as the contents are removed. The bead portion 34 and the inturned flange 35 of the top rim are preferably slightly rounded so as to provide a smooth and finished rim for the top edge of the container.

When the contents have been removed, the container may be economically discarded since the entire cost of the container is less than the normal cost of re-collecting the same. Since the container is made entirely of fibreboard, except for the top and bottom metal rim, the same can be inserted in an incinerator immediately after the ice cream has been removed therefrom, and destroyed. The retailer is thus able to keep his premises in a sanitary and attractive condition, and is free from the nuisance and annoyance of looking after the empty fly and vermin attracting cans which occupy valuable storage space and which must be returned. The ice cream manufacturer, on the other hand, is free from the cost, annoyance and trouble of can collections, as well as the loss and destruction of cans due to dishonest or careless retailers.

The body member A of the container may be made conical if desired, and round, elliptical, polygonal, or other cross sectional shape. In addition, to the packaging of ice cream, the container may also be used for the packaging and shipment of dry and semi-dry products of all descriptions, and is especially adapted for the packaging of foodstuffs.

While certain novel features of the invention have been disclosed and are pointed out in the annexed claims, it will be understood that various omissions, substitutions and changes may be made by those skilled in the art without departing from the spirit of the invention.

What is claimed is:

1. A container for ice cream adapted to be shipped in knockdown condition and set up into rigid condition by the user, said container comprising in combination, a collapsible tubular member of paperboard material having an expansible portion at one end thereof, a conical sleeve adapted to telescope over said expansible end, an inner piece adapted to be inserted into the container to force the expansible end outwardly into said conical sleeve, a rim portion at the other end of said tubular member, and a cover adapted to be snapped in interlocking engagement with said rim, said inner piece and cover cooperating to reinforce said tubular member against inward collapse.

2. A container for ice cream adapted to be shipped in knockdown condition and set up into rigid condition by the user, said container comprising in combination, a collapsible tubular member of paperboard having an expansible portion and an inturned portion at one end thereof, a conical sleeve adapted to be telescoped over said expansible end portion, an insert piece seated over said inturned portion and holding the expansible portion in interlocking engagement with said conical sleeve, a rim portion at the other end of said tubular member, and a cover adapted to be snapped into interlocking engagement with said rim, said insert piece and cover cooperating to reinforce said tubular member against inward collapse and to maintain the same in rigid fully expanded container forming position.

3. A container for ice cream adapted to be shipped in knockdown condition and set up into rigid condition by the user, said container comprising in combination, a collapsible tubular member of paperboard material having an expansible portion at one end thereof, a conical sleeve of metallic material adapted to be telescoped over said expansible end portion, an inner piece of paperboard material adapted to be inserted into the container to force the expansible portion outwardly into interlocking engagement with said conical sleeve, a rim portion at the other end of said tubular member, and a cover adapted to be snapped into interlocking engagement with said rim, said conical sleeve and cover cooperating to provide, when said container is set up, a permanent structural frame for strengthening and reinforcing the ends thereof.

4. A container for ice cream adapted to be shipped in knockdown condition and set up into rigid condition by the user, said container comprising in combination, a collapsible tubular member of paperboard material having an expansible portion at one end thereof, a conical sleeve of metallic material adapted to be telescoped over said expansible end portion, an inner piece of paperboard material adapted to be inserted into the container to force the expansible portion outwardly into interlocking engagement with said sleeve, a rim portion at the other end of said tubular member, and a cover having a metallic flange portion adapted to be snapped into interlocking engagement with said rim, said conical sleeve, inner piece and flange portion cooperating to reinforce said tubular member against inward collapse, to maintain the same in rigid fully expanded container forming position, and to provide a permanent structural frame therefor strengthening and reinforcing the ends thereof.

5. A container for ice cream adapted to be shipped in knockdown condition and set up into rigid condition by the user, said container comprising in combination a collapsible tubular member of paperboard material having an expansible portion and an inturned portion at one end thereof, a conical sleeve of metallic material adapted to be telescoped over said expansible end portion, an insert piece of paperboard material seated over said inturned portion and holding the expansible portion in interlocking engagement with said conical sleeve, a rim portion secured to the other end of said tubular member, and a cover having a metallic flange portion adapted to be snapped into interlocking engagement with said rim, said conical sleeve, insert piece and flange portion cooperating to reinforce said tubular member against inward collapse, to maintain the same in rigid fully expanded container forming position, and to provide a permanent structural frame therefor strengthening and reinforcing the ends thereof.

6. A container of the character described, including a paperboard body member having longitudinally extending fold lines permitting collapse of said body member into substantially flat condition, said body member having expansible fingers at one end thereof, a closure member having a metallic inwardly inclined side flange portion, and a disc insert holding said fingers firmly pressed against said inclined side flange to bind said body member and closure member together, said disc insert being further operative to retain said body member in full expanded position, and to prevent inward collapse thereof.

7. A container of the character described including a body member formed of paperboard material having longitudinally extending fold lines permitting collapse of said body member into substantially flat condition, a deformable portion at one end thereof, a closure member comprising a metallic rim surrounding said deformable portion, said rim having an inclined upwardly extending side wall and an inwardly projecting bottom flange, an end member seated on said flange, and an insert within the container holding said deformable portion interlocked with said inclined side flange, said disc insert being further operative to retain said body member in full expanded position, and to prevent inward collapse thereof.

8. A container of the character described including a body member of paperboard material having longitudinally extending fold lines permitting collapse of said body member into substantially flat condition, a deformable portion at one end thereof, a closure member comprising a metallic rim surrounding said deformable portion, said rim having an inclined upwardly extending side wall and an inwardly projecting bottom flange, an end member seated on said flange and means operative to retain said body member in fully expanded position and to prevent inward collapse thereof.

9. A body member for a container comprising a tubular portion having longitudinally extending fold lines permitting collapse of said tubular portion into substantially flat condition for lateral stacking, said tubular portion having a series of downwardly extending tabs having an outwardly expansible portion and an inwardly extensible portion, and an outwardly extending flange at the other end thereof.

10. A body member for a container comprising a tubular portion having longitudinally extending fold lines permitting collapse of said tubular portion into substantially flat condition, said tubular portion having a series of outwardly expansible downwardly extending tabs, said tabs each having an end portion adapted to be turned inwardly, and a downwardly extending flange at the other end thereof providing means to which an end member may be interlocked.

11. A body member for an ice cream container including, a tubular body forming portion having longitudinally extending fold lines permitting collapse of said tubular portion into substantially flat condition for lateral stacking, a series of tabs extending from one end of said tubular body portion, said tabs normally extending substantially in the plane of said body portion, and fold lines extending transversely across said tabs defining when said body member is expanded, an outwardly expansible portion and an inwardly extensible portion.

JOHN ERNEST PAGE.